本3,501,514
SUBSTITUTED BIS ORGANO SULFONES AND SULFOXIDES AND METHOD FOR THE PREPARATION THEREOF
Robert A. Grimm, Savage, and Robert C. Slagel, Burnsville, Minn., assignors to Ashland Oil & Refining Company, Ashland, Ky., a corporation of Kentucky
No Drawing. Continuation-in-part of application Ser. No. 458,375, May 24, 1965. This application Apr. 22, 1966, Ser. No. 544,391
Int. Cl. C07c 143/90, 147/00
U.S. Cl. 260—400       12 Claims

ABSTRACT OF THE DISCLOSURE

A class of bis organo sulfone and sulfoxide derivatives are provided by the reaction of an ethylenically unsaturated compound with sulfur dichloride to form the corresponding dichloride diadduct of which the chloro substituents are converted to a variety of other functional groups and thereupon the thioether is oxidized to either the corresponding sulfone or sulfoxide.

---

This application is a continuation-in-part application of my copending application Ser. No. 458,375, filed May 24, 1965, now abandoned.

This invention relates to novel sulfones and sulfoxides and more particularly it relates to high-molecular weight, functionally substituted sulfone-contaning diadducts or sulfoxide-containing diadducts.

The compounds of this invention can be represented by the general formula:

XR–Y–RX wherein:

Y is a divalent radical selected from the group consisting of sulfone and sulfoxide;
X is a member of the group consisting of chlorine, hydrogen, hydroxy, and cyano;
R is a member of the group consisting of alkyl, alkylate, cycloalkylate and cycloalkyl anhydride when X is chlorine, hydroxy, or cyano, the latter three R members including the corresponding alkali metal and alkaline earth metal salt derivative moieties and the corresponding carboxyl, amido, and hydrazido derivatives moieties when X is hydroxy or cyano, or R is a member of the group consisting of alkenyl and alkenylate when X is hydrogen, the latter two R members including the corresponding alkali metal and alkaline earth metal salt derivative moieties and the corresponding carboxyl, amido, and hydrazido derivative moieties;

said XR substituent having at least 4 carbon atoms, and said X and Y being bonded to adjacent carbon atoms in the common R group to which they are attached. The term "cycloalkyl anhydride" is meant to include any cycloaliphatic radical which contains a dicarboxylic anhydride group.

The compounds of this invention usually are oily liquids which are useful as bacteriostats, additives for extreme pressure lubricants, and components for preparing polyurethanes and other polymers, fabric modifiers, and emollients.

The process by means of which the compounds of this invention are prepared involves two or three steps, depending on the type of final product desired. In the first step, two moles of a monoolefin, an unsaturated mono- or polyester, or an unsaturated cycloaliphatic dicarboxylic anhydride are reacted wtih one mole of sulfur dichloride to produce an intermediate product which is a diadduct in which the two molecules of olefin are jointed by a sulfide bridge and a chlorine is attached to each molecule of the olefin. In the second step of the process, this diadduct is converted to the appropriate derivative and then is oxidized to convert the sulfide to a sulfone or sulfoxide. If it is desired to produce the compound of this invention in which X in the above formula is hydrogen, the sulfone diadduct or sulfoxide diadduct of the second step must be dehydrohalogenated in a third step.

In a preferred mode of operation, a fatty monounsaturated monoester, such as ethyl oleate, is dissolved in a suitable solvent, such as anhydrous ether, and is reacted at a temperature of about 0° C. with sulfur dichloride in the absence of light for a period of several hours. The intermediate product is then reacted with a peroxygen compound, such as peracetic acid at slightly elevated temperatures for several hours to convert the sulfide group to a sulfone group or to a sulfoxide group.

In the first step of the process of this invention, long chain olefins or esters of unsaturated carboxylic acids, particularly the fatty acid esters such as the oleates or the tallow esters, are reacted with sulfur dichloride ($SCl_2$). In general, the olefins are esters will have from 4 to 26 carbon atoms per molecule, the preferred olefins being acyclic mono-olefins having from about 8 to 26 carbon atoms and the preferred esters being monoesters of monounsaturated fatty acids having from about 12 to 26 carbon atoms. When internal olefins are employed, the cis-olefins are preferred. Because of their availability and because the product derived from them usually has better properties than those derived from other starting materials, the commercial oleates are the preferred starting materials. The products which are produced by the process of the present invention occur in different isomeric forms due to the fact that the addition of sulfur and chlorine may occur on either of the two unsaturated carbon atoms in the unsaturated starting material, and since two molecules of unsaturated starting material go to make up one molecule of the intermediate product, the number of isomeric forms is increased even further. However, the physical and chemical properties of these isomers are substantially identical and they may thus be considered as a single compound.

All isomers can be formed by the process of this invention.

Among the specific materials which can be employed as starting materials for the process of this invention are olefins such as 1-butene, 1-pentene, 1-hexene, 1-octene, 1-decene, 4-decene, 1-dodecene, 2-dodecene, 7-dodecene, 1-octadecene, 1-hexacontene, and the like. Among the unsaturated esters used as starting materials are the esters of crotonic acid, undecenoic acid, myristoleic acid, oleic acid, linolenic acid, eleostearic acid, palmitoleic acid, petroselenic acid, erucic acid, eliadic acid, $\Delta^4$-tetrahydrophthalic acid, nadic acid, and isomers of these acids, and triglycerides such as tallow triglyceride, olive triglyceride, and the like. These esters are preferably lower alkyl esters derived from mono- or polyhydric alcohols (e.g. glycerol) having from 1 to 8 carbon atoms such as ethyl decenoate, ethyl myristoleate, propyl palmitoleate, butyl oleate, methyl crotonate, tallow triglyceride, 1,2-ethanedioleate, and the like, although aryl esters and cycloalkyl esters can be similarly employed. Anhydrides suitable as starting materials include $\Delta^4$-tetrahydrophthalic anhydride and nadic anhydride.

The other component of the first step in the process of this invention is sulfur dichloride. When one mole of sulfur dichloride is reacted with two moles of an olefin, an unsaturated ester, or an unsaturated anhydride as described above, the sulfur dichloride splits to permit one chlorine to attach to an unsaturated carbon atoms in one molecule of the olefinic material, the other chlorine to attach to a similar unsaturated carbon atom in the other molecule of the olefinic material, and the sulfur atom to form a bridge between the other two unsaturated adjacent carbons in the two molecules of olefinic material.

The reaction conditions for the first step of the process of this invention are such that the temperatures should be preferably at about 0° C. The reaction is highly exothermic and substantially instantaneous, and accordingly, a higher temperature serves no good purpose, but, to the contrary causes some increasing amounts of undesirable substitution. However, both higher and lower temperatures will produce the diadducts of the present invention. The reaction is preferably carried out by dissolving the olefinic material in a solvent which, at the reaction conditions, is unreactive toward sulfur dichloride. Such solvents include, but are not limited to, ethers such as diethyl ether, bis-2-methoxyethylether, and 1,2-dimethoxyethane; aliphatic hydrocarbons such as hexane, cyclohexane, and commercial products such as Skelly B and Skelly F; halogenated hydrocarbons such as chlorobenzene carbon tetrachloride, chloroform, and the fluorochlorohydrocarbons (such as "Freon") and the aromatic hydrocarbons such as benzene, the toluenes, and the xylenes.

When the olefinic material is a liquid at the reaction conditions, it is not necessary to include a solvent to facilitate the reaction. Since the materials are somewhat sensitive to photo-initiated side reactions, it is preferable that the reaction be carried out in the dark.

In copending application Ser. No. 544,401 filed by Robert A. Grimm and Robert C. Slagel on April 22, 1966 there are described and claimed many disubstituted diadducts and the processes for preparing them. Many of these materials are useful in the process of the present invention for preparing sulfone diadducts and sulfoxide diadducts.

The product produced by the reaction of the olefinic material and the sulfur dichloride generally is a stable, yellow oil having a slightly sulfurous odor. If the crude product is extracted with an alcohol or other suitable extractant which is reactive toward the sulfur-containing reagents, the odor is considerably reduced.

In the next step of the process, the sulfide is oxidized to a sulfone or sulfoxide. The sulfone is preferably prepared by oxidizing the sulfide with at least two chemical equivalents of a peroxyacid such as peroxyacetic acid, peroxyformic acid, and peroxyphthalic acid at moderate temperatures, e.g., 20–60° C., sufficient to produce practical reaction rates. The sulfoxide is preferably prepared by oxidizing the sulfide with one chemical equivalent of said peroxyacid at said moderate temperatures sufficient to produce practical reaction rates.

The sulfone dichloride or sulfoxide dichloride can be dehydrohalogenated to provide unsaturation. Dehydrohalogenation removes a hydrogen from the carbon atom that is bonded to the sulfone group or sulfoxide group, and it removes the chlorine that is attached to the next adjacent carbon atom. The dehydrohalogenation process is effected by any of several reagents. For example, alkali metal alcoholates, alkali metal hydroxides, or tertiary amine may be used for this purpose. It is preferred in some embodiments of this invention to use the alkali metal alcoholate derived from the same alcohol as the alcoholic portion of the original ester starting material; i.e., if ethyl oleate is the starting material, sodium ethoxide is employed for dehydrohalogenation so as to minimize any interchange between the ester group of the starting material and the alcoholate portion of the reagent. Sodium hydroxide is a suitable reagent, although care must be used to prevent the ester group in the starting material from being saponified to the corresponding acid group. Tertiary amines are also suitable for this purpose, e.g., tributylamine, lutidine, and collidine. In the case of the amines, it is frequently necessary to employ elevated reaction temperatures, over about 100° C., in order to achieve practical reaction rates, while in the case of the alcoholates and the hydroxides, lower temperatures, in the vicinity of room temperature, are adequate.

Specific compounds within the scope of this invention include, but are not limited to, the following illustrative examples.

(1) THE BIS-(SUBSTITUTED-ALKYLATE) SULFONES bis-9(10)-(butyl-10(9)-chlorostearate)sulfone
bis-9(10)-ethyl-10(9)-chlorostearate)sulfone
bis-9(10)-(methyl-10(9)-chlorostearate)sulfone
bis-9(10)-(methyl-10(9)-chloropalmitate)sulfone
bis-13(14)-(ethyl-14(13-chlorobehenate)sulfone
bis-9(10)-(ethyl-10(9)-hydroxystearate)sulfone
bis-13(14)-(ethyl-14(13)-chlorobehenate)sulfonate
bis-13(14)-(butyl-14(13)-hydroxybehenate)sulfone
bis-13(14)-(ethyl-14(13)-cyanostearate)sulfone
bis-9(10)-(isopropyl-10(9)-cyanostearate)sulfone (2) THE BIS(SUBSTITUTED-ALKYL)SULFONES bis-1(2)-(2(1)-chlorododecane)sulfone
bis-1(2)-(2(1)-chloroeicosane)sulfone
bis-1(2)-(2(1)-chlorooctane)sulfone
bis-4(5)-(5(4)-chlorodecane)sulfone
bis-9(10)-(10(9)-chlorooctadecane)sulfone
bis-1(2)-(2(1)-hydroxydodecane)sulfone
bis-4(5)-(5(4)-cyanodecane)sulfone
bis-4(5)-[5(4)-(2,3-dihydroxypropoxy)decane]sulfone (3) THE BIS-(CHLOROCYCLOALKYL ANHYDRIDE)SULFONES bis-(2-chloro-4,5-dicarboxylic anhydride-cyclohexyl)sulfone
bis-(2-chloro-4,5-dicarboxylic anhydride-bicyclo-(2.2.1)-heptyl)sulfone (4) THE BIS-(CHLOROCYCLOALKYLATE) SULFONES bis-(2-chloro-4,5-dicarbo-n-butoxy-cyclohexyl)sulfone
bis-1(2)-(2(1)-chloro-4-carboethoxy-cyclohexyl)-sulfone (5) THE BIS-(ALKENYL)SULFONES [1]

bis-1(2)-(1-decene)sulfone
bis-1(2)-(1-dodecene)sulfone
bis-4(5)-(4-decene)sulfone
bis-1(2)-(1-octadecene)sulfone (6) THE BIS-(ALKENYLATE)SULFONES [1]

bis-9(10)-(ethyl oleate)sulfone
bis-9(10)-(methyl oleate)sulfone
bis-9(10)-(methyl palmitoleate)sulfone
bis-9(10)-(butyl palmitoleate)sulfone
bis-13(14)-(ethyl erucate)sulfone (7) THE BIS-(SUBSTITUTED-ALKYLATE) SULFOXIDES bis-9(10)-(butyl-10(9)-chlorostearate)sulfoxide
bis-9(10)-(ethyl-10(9)-chlorostearate)sulfoxide
bis-9(10)-(methyl-10(9)-chlorostearate)sulfoxide
bis-9(10)-(methyl-10(9)-chloropalmitate)sulfoxide
bis-13(14)-(ethyl-14(13)-chlorobehenate)sulfoxide
bis-9(10)-(ethyl-10(9)-hydroxystearate)sulfoxide
bis-9(10)-(methyl-10(9)-hydroxypalmitate)sulfoxide
bis-13(14)-(butyl-14(13)-hydroxybehenate)sulfoxide
bis-13(14)-(ethyl-14(13)-cyanostearate)sulfoxide
bis-9(10)-(isopropyl-10(9)-cyanostearate)sulfoxide (8) THE BI-(SUBSTITUTED-ALKYL)SULFOXIDES bis-1(2)-(2(1)-chlorododecane)sulfoxide
bis-1(2)-(2(1)-chloroeicosane)sulfoxide
bis-1(2)-(2(1)-chlorooctane)sulfoxide
bis-4(5)-(5(4)-chlorodecane)sulfoxide
bis-9(10)-(10(9)-chloroocetadecane)sulfoxide
bis-1(2)-(2(1)-hydroxydodecane)sulfoxide bis-4(5)-(5(4)-cyanodecane)sulfoxide
bis-4(5)-[5(4)-(2,3-dihydroxypropoxy)decane]sulfoxide

(9) THE BIS-(CHLOROCYCLOALKYL ANHYDRIDE)SULFOXIDES bis-(2-chloro-4,5-dicarboxylic anhydride-cyclohexyl)sulfoxide
bis-(2-chloro-4,5-dicarboxylic anhydride-bicyclo(2.2.1)-heptyl)sulfoxide

(10) THE BIS(CHLOROCYCLOALKYLATE) SULFOXIDES bis(2-chloro-4,5-dicarbo-n-butoxy-cyclohexyl)sulfoxide
bis-1(2)-(2(1)-chloro-4-carboethoxy-cyclohexyl)sulfoxide

(11) THE BIS-(ALKENYL)SULFOXIDES [1]

bis-1(2)-(1-decene)sulfoxide
bis-1(2)-(1-dodecene)sulfoxide
bis-4(5)-(4-decene)sulfoxide
bis-1(2)-(1-octadecene)sulfoxide

(12) THE BIS-(ALKENYLATE)SULFOXIDES [1]

bis-9(10)-(ethyl oleate)sulfoxide
bis-9(10)-(methyl oleate)sulfoxide
bis-9(10)-methyl palmitoleate)sulfoxide
bis-9(10)-(butyl palmitoleate)sulfoxide
bis-13(14)-(ethyl erucate)sulfoxide A better understanding of this invention may be obtained by reference to the following illustrative examples. Parts and percentages are by weight unless otherwise specified and temperatures are expressed in degrees centigrade unless otherwise indicated.

EXAMPLE 1

A 500 ml. three-necked round bottom flask and a jacketed addition funnel were covered with aluminum foil so that no light could reach the interior of these pieces of reaction apparatus. To the flask was added a mixture of 50 grams of ethyl oleate (purity greater than 96%) and 100 ml. of anhydrous ethyl ether. The contents of the flask were then stirred magnetically and cooled to 0° C. Sulfur dichloride, in the amount of 5.1 ml. and freshly distilled from phosphorous trichloride, was dissolved in 100 ml. of ethyl ether and cooled with a Dry-Ice bath. The sulfur dichloride solution was then slowly added to the oleate solution. After the addition was complete, the resulting solution was allowed to stand for one-half hour at 0° C. before it was concentrated. The oily concentrate was mixed with sodium bicarbonate, filtered, and then extracted with methanol. The extracted product was further concentrated to produce 54.7 grams of a pale yellow, odorless oil, a yield of 94%. The analysis of the product for sulfur, chlorine and molecular weight matched well with theory: Cal.: molecular weight 723.5; percent S, 4.42; percent Cl, 9.82. Found: molecular weight 690; percent S, 4.16; percent Cl, 10.2; indicating the product to be bis-(9(10)-ethyl-10(9)-chlorostearate)sulfide. This material did not contain any ethyl oleate and appeared homogeneous when analyzed by thin layer chromatography (TLC). Yields in other preparations similar to this one ranged from 86% to 94%, depending on the method of work-up.

EXAMPLE 2

To a solution of 100 grams of bis-9(10)-(ethyl-10(9)-chlorostearate) sulfide dissolved in 600 ml. of glacial acetic acid was added a solution of 16.6 ml. of 50% hydrogen peroxide in 25 ml. of glacial acetic acid. The solutions were mixed at room temperature and the resulting solution was then heated to 45–50° C. overnight. An additional portion of 1 ml. of hydrogen peroxide was then added because a test for active oxygen (starch-iodide) was negative. After two more hours, active oxygen was detected in the mixture, and the reaction appeared complete.

The reaction mixture was poured into water and extracted with low boiling hydrocarbon fractions. The extract was decolorized, dried, and concentrated to 65 grams of a pale green oil. Analysis for molecular weight, sulfur, and chloride matched well with theory. Calculated molecular weight: 755, 4.24% sulfur, 9.38% chlorine. Found: molecular weight 648, 725, 3.8% sulfur, 9.5% chlorine. Infrared analysis indicated the presence of a sulfonyl group. The product, bis-9(10)-(ethyl-10(9)-chlorostearate)sulfone liberates hydrogen chloride when heated to 200–250° C. and therefore is useful in lubricating oils as an extreme-pressure additive.

EXAMPLE 3

A solution was prepared by dissolving 4.1 grams of bis-9(10)-(ethyl-10(9)-chlorostearate)sulfone in 30 ml. of ethanol. A solution of 0.74 gram of sodium ethoxide dissolved in 10 ml. of ethanol was added to the first solution. A precipitate of sodium chloride (0.516 g., 82.4% of theory) formed.

The resulting mixture was poured into water and the oily layer which formed on the surface of the water was removed and extracted with ether. The extract was then washed with water until neutral, dried, and concentrated to give yields of 94–95%, the product being bis-9(10)-(ethyl oleate)sulfone.

In the same manner as described in Example 3 the product can be prepared by employing other bases or by inducing dehydrohalogenation by heating the intermediate compound to a temperature of about 250° C.

EXAMPLE 4

A solution was prepared by dissolving 40 grams (0.06 mole) of bis-(2-chloro-4,5-dicarbo-n-butoxy-cyclohexyl)-sulfide in 40 grams of glacial acetic acid. To this solution was added dropwise 27.4 grams of 40% peracetic acid at a temperature of 49°–55° C. until the active oxygen content of the reaction mixture dropped to less than 1%. Approximately 0.5 liter of water was added and the resulting mixture was extracted several times with benzene. The benzene extracts were combined and evaporated under vacuum on a steam bath. A quantitative yield of the product was obtained which upon infrared analysis was identified as bis-(2-chloro-4,5-dicarbo-n-butoxy-cyclohexyl)sulfone.

EXAMPLE 5

A solution was prepared by dissolving 400 grams of bis-9(10)-(methyl-10(9)-chlorostearate)sulfide in 1.5 liters of acetic acid. To this solution there was added slowly and at room temperature 70 ml. of 50% hydrogen peroxide. After standing overnight at room temperature, the mixture poured into water and extracted with hydrocarbon fractions. The extracts were combined, washed with water until no more active oxygen was present, dried, and concentrated. After standing in a refrigerator over a weekend, crystals had formed on the bottom of the container. The crystals were removed by filtration and recrystallized from Skelly B to give fine tufts of needlelike crystals having a melting point of 78.5°–80° C. The product was bis-9(10)-(methyl-10(9)-chlorostearate)sulfoxide. Elemental analysis agreed with that calculated for the sulfoxide. Calc.: percent C, 64.1; percent H, 10.11; percent Cl, 10.1; percent S, 4.5; percent O (by difference), 10.8. Found: percent C, 64.13; percent H, 10.01; percent Cl, 9.81; percent S, 5.0; percent O (by difference), 11.0.

---

[1] It is to be understood that mixtures of isomers will normally be present in these instances. For example, the diadduct made from ethyl oleate will be a mixture of bis-9-(ethyl oleate)sulfone, bis-10(ethyloleate)sulfone, and the unsymmetrical compound resulting from the sulfone bridge bonding to the 9th carbon in one ethyl oleate chain and the 10th carbon in the other ethyl oleate chain.

EXAMPLE 6

Bis-(isopropyl-β-chlorostearate)-sulfide (100 g.) was mixed with saturated sodium bicarbonate solution (1 liter). The mixture was vigorously stirred and heated under reflux for 12 hours. The mixture was allowed to cool and the hydrocarbon portion was separated from the aqueous portion of the reaction mixture. The hydrocarbon portion was dissolved in ether, washed twice with water, dried over sodium sulfate and concentrated to a pale yellow oil that slowly crystallized. The crystalline product was established as bis-(isopropyl-β-hydroxystearate)sulfide by molecular weight, hydroxyl value, saponification value, acid value, and elemental analyses. The α-naphthyl urethane derivative of this product was prepared by heating α-naphthylisocyanate with said product at 100° C.

Ninety-nine g. of the sulfide prepared as described above was dissolved in a solution of peracetic acid. The latter was prepared as follows: acetic acid (1000 ml.), 35% hydrogen peroxide (42 ml.), and concentrated sulfuric acid (6 drops) were allowed to stand overnight at room temperature. Sodium acetate (7 g.) was then dissolved in the solution and the above sulfide (99 g.) added. After 4 hours at 40°–50° C., the mixture was cooled and poured into two volumes of water. The hydrocarbon phase was extracted into ether and the ether extracts washed with salt water until no more active oxygen was detected in the washes. The ether solution was then dried over sodium sulfate and concentrated to give a nearly water white oil, which was confirmed by infra red spectrum to be bis-(isopropyl-β-hydroxystearate)sulfone.

EXAMPLE 7

Bis-(isopropyl chlorostearate)sulfide (20 g.) was mixed with glycerol (70 ml.), t-butyl alcohol (300 ml.) and sodium bicarbonate (4 g.). The pearlescent suspension was heated to 50° C. After 36 hours, the reaction mixture was filtered to remove salts and the t-butyl alcohol was removed under vacuum. Upon removal of the t-butyl alcohol, the reaction mixture separated into a glycerol layer and a product layer. The product layer was separated and dissolved in ether. The ether solution was washed three times with water, then was dried over sodium sulfate and finally concentrated to a pale yellow oil, established as bis-[isopropyl-(2,3-dihydroxypropoxy)-stearate]-sulfide by hydroxyl value and infrared analyses.

Ten g. of the adduct prepared as described above was dissolved in a peracetic acid solution prepared by reaction of acetic acid (300 ml.), 35% hydrogen peroxide (11 ml.), and concentrated sulfuric acid (2 drops) at room temperature for 16 hours. The peracetic acid solution was buffered with sodium acetate (3 g.) before the sulfide was added. The mixture was heated at 50° C. for 4 hours when it was poured into water and the resulting oil extracted into ether. The ether extracts were washed with salt water until no more active oxygen was present, dried over sodium sulfate, and concentrated to a yellow oil, which was established by hydroxyl value and infra red determinations to be bis-[isopropyl-(2,3-dihydroxypropoxy)stearate]-sulfone.

The foregoing examples and disclosures are intended to be illustrative and descriptive and not to be restrictive. The procedures set forth in the foregoing examples are similarly applicable to other olefinic materials included within the scope of the present invention. Many variations and different embodiments of the described invention will be apparent to those skilled in the art.

What is claimed is:

1. A compound having the formula

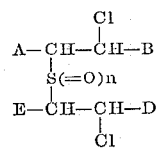

wherein $n$ is 1 or 2; each A, B, E and D individually is selected from the group consisting of —H, —$(CH_2)_aH$, and

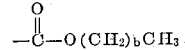

each $a$ and $b$ individually is a number from 0–24 provided that the sum of the carbon atoms of A and B taken together and that the sum of the carbon atoms of E and D taken together are from 2 to 24 carbon atoms and that either A or B is a

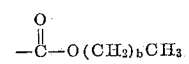

group and that either E or D is a

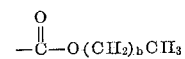

group.

2. The compound of claim 1 wherein $n=1$.
3. The compound of claim 1 wherein $n=2$.
4. The compound of claim 1 which is bis-9(10)-(methyl-10(9)-chlorostearate) sulfoxide.
5. The compound of claim 1 which is bis-9(10)-(methyl-10(9)-chlorostearate) sulfone.
6. The compound of claim 1 which is bis-9(10)-(butyl-10(9)-chlorostearate) sulfoxide.
7. The compound of claim 1 which is bis-9(10)-(ethyl-10(9)-chlorostearate) sulfoxide.
8. The compound of claim 1 which is bis-9(10)-(methyl-10(9)-chloropalmitate) sulfoxide.
9. The compound of claim 1 which is bis-(9-10)-(methyl-10(9)-chloropalmitate) sulfone.
10. The compound of claim 1 which is bis-14(13)-(ethyl-13(14)-chlorobehenate) sulfoxide.
11. The compound of claim 1 which is bis-14(13)-ethyl-13(14)-chlorobehenate) sulfone.
12. The compound of claim 1 wherein the sum of the carbon atoms of A and B taken together and the sum of the carbon atoms of E and D taken together is from 10 to 24 carbon atoms.

References Cited

UNITED STATES PATENTS

| | | | |
|---|---|---|---|
| 2,644,811 | 7/1953 | Beretvas | 260—399 X |
| 2,789,991 | 4/1957 | Brockman et al. | 260—400 |

OTHER REFERENCES

Lucas, Organic Chemistry, 2nd ed., 1953, American Book Co., N.Y., pp. 61, 65, 112, 114 and 115.

ALEX MAZEL, Primary Examiner

J. H. TURNIPSEED, Assistant Examiner

U.S. Cl. X.R.

260—346.3, 401, 456, 457, 465.6, 465.7, 465.8, 468, 481, 545, 546, 607, 608